US010186103B2

(12) United States Patent
Nishida et al.

(10) Patent No.: US 10,186,103 B2
(45) Date of Patent: Jan. 22, 2019

(54) PAPER SHEET HANDLING MACHINE

(71) Applicant: GLORY LTD., Himeji-shi, Hyogo (JP)

(72) Inventors: Koichi Nishida, Hyogo (JP); Takeshi Yokawa, Hyogo (JP)

(73) Assignee: GLORY LTD., Himeji-shi, Hyogo (JP)

( * ) Notice: Subject to any disclaimer, the term of this patent is extended or adjusted under 35 U.S.C. 154(b) by 0 days.

(21) Appl. No.: 15/549,445

(22) PCT Filed: Jan. 28, 2016

(86) PCT No.: PCT/JP2016/052479
§ 371 (c)(1),
(2) Date: Aug. 8, 2017

(87) PCT Pub. No.: WO2016/129397
PCT Pub. Date: Aug. 18, 2016

(65) Prior Publication Data

US 2018/0025570 A1 Jan. 25, 2018

(30) Foreign Application Priority Data

Feb. 9, 2015 (JP) ................................ 2015-023658

(51) Int. Cl.
*G06Q 40/00* (2012.01)
*G07D 11/00* (2006.01)
*G07D 9/00* (2006.01)

(52) U.S. Cl.
CPC ........... *G07D 11/0021* (2013.01); *G07D 9/00* (2013.01); *G07D 11/0009* (2013.01); *G07D 11/0084* (2013.01); *G07D 11/0042* (2013.01)

(58) Field of Classification Search
CPC .... G07F 19/20; G07F 19/201; G06Q 20/1085
(Continued)

(56) References Cited

U.S. PATENT DOCUMENTS 9,141,876 B1 * 9/2015 Jones ....................... G06K 9/60
2007/0122023 A1 * 5/2007 Jenrick .................. G07D 7/162
382/135

(Continued)

FOREIGN PATENT DOCUMENTS

JP 2012-174130 A 9/2012
JP 2014-10489 A 1/2014

(Continued)

OTHER PUBLICATIONS

Written Opinion of International Searching Authority (International Application No. PCT/JP2016/052479) (8 pages—dated Mar. 15, 2016).

(Continued)

*Primary Examiner* — Ahshik Kim
(74) *Attorney, Agent, or Firm* — Renner, Kenner, Greieve, Bobak, Taylor & Weber

(57) ABSTRACT

A paper sheet handling machine (for example, a banknote handling machine 10) includes a lower assembly 16 that includes a plurality of storage units (such as a banknote storage bag 34 or banknote storage cassette 36) for storing the paper sheet sent from a transporting unit 24 of an upper assembly 14 and a controlling unit 50 configured to perform control to sort the paper sheet, to be sent from the transporting unit 24 of the upper assembly 14 to the lower assembly 16, to each of the storage units based on a predetermined classification condition designated in advance.

17 Claims, 8 Drawing Sheets

(58) Field of Classification Search
USPC .......................................................... 235/379
See application file for complete search history.

(56) References Cited

U.S. PATENT DOCUMENTS

| | | | | |
|---|---|---|---|---|
| 2009/0183967 | A1 | 7/2009 | Hamasaki | |
| 2012/0024659 | A1* | 2/2012 | Mizoro | G07D 11/0012 194/206 |
| 2012/0173013 | A1 | 7/2012 | Nakamoto et al. | |
| 2014/0069769 | A1 | 3/2014 | Kobayashi et al. | |
| 2014/0130450 | A1 | 5/2014 | Uehara et al. | |

FOREIGN PATENT DOCUMENTS

| | | | |
|---|---|---|---|
| JP | 2014-179130 | A | 9/2014 |
| WO | WO 2007/044570 | A2 | 4/2007 |
| WO | WO 2010/049994 | A1 | 5/2010 |

OTHER PUBLICATIONS

European Search Report (Application No. 16749041.6—PCT/JP20161052479)(7 pages—dated Sep. 18, 2018).

* cited by examiner

PAPER SHEET HANDLING MACHINE

TECHNICAL FIELD

The present invention relates to a paper sheet handling machine that performs various processes such as a depositing process of paper sheets such as banknotes and the like.

DESCRIPTION OF THE RELATED ART

As a paper sheet handling machine for performing a depositing process of paper sheets such as banknotes and the like, one of the type in which the paper sheets taken in a housing are stored in a storage bag such as a pouch bag and the like has been conventionally used. As such a paper sheet handling machine, for example, one disclosed in Japanese Patent Application Laid-Open No. 2012-174130 (JP2012-174130A) and the like is conventionally known. According to Japanese Patent Application Laid-Open No. 2012-174130, such a paper sheet handling machine is used as a part of a cash teller apparatus (specifically, a banknote teller apparatus) installed in a backyard area in a store such as a supermarket and the like. The cash teller apparatus dispenses money as a change fund to be replenished in a cash settlement apparatus provided in a front area and deposits money as sales proceeds collected from the cash settlement apparatus.

In the paper sheet handling machine disclosed in Japanese Patent Application Laid-Open No. 2012-174130, one storage bag can be mounted in one paper sheet handling machine. On the other hand, in a case where a plurality of storage bags can be mounted in one paper sheet handling machine, the paper sheets fed out to inside of the housing from the inlet unit of the paper sheet handling machine are all stored in a single storage bag in a mixed state, and when this storage bag becomes in a full state, a place to which the paper sheets are sent is switched to another storage bag.

SUMMARY OF INVENTION

As described above, in the conventional paper sheet handling machine, even when a plurality of storage bags are mounted, various types of paper sheets are stored in each storage bag in the mixed state. However, with such a paper sheet storing method, after the storing bag is taken out from the paper sheet handling machine, there is a problem that it is necessary to classify the paper sheets after the paper sheets are taken out from the storing bags and it takes time and labor. In addition, the paper sheets stored in a plurality of storage bags can not be used for different purposes for each storage bag, resulting in lack of versatility.

The present invention was made in view of the above discussion. An object of the present invention is to provide a paper sheet handling machine in which it is possible to use the paper sheets stored in a plurality of storage units for different purposes for each storage unit, and the burden of work for an operator can be reduced since there is no need to classify the paper sheets in post-process.

A paper sheet handling machine of the present invention includes: an upper assembly including an inlet unit for putting a paper sheet into inside of a housing from outside, an ejecting unit for ejecting the paper sheet from inside of the housing to outside, a transporting unit connected to the inlet unit and the ejecting unit, for transporting the paper sheet within the housing, and a recognition unit provided to the transporting unit for recognizing the paper sheet being transported by the transporting unit; a lower assembly including a plurality of storage units for storing the paper sheet sent from the transporting unit of the upper assembly; and a controlling unit configured to perform control to sort the paper sheet that is to be sent from the transporting unit of the upper assembly to the lower assembly, to each of the storage units based on a predetermined classification condition designated in advance.

In the paper sheet handling machine as described above, at least one of the plurality of storage units may be a paper sheet storage bag.

Alternatively, at least one of the plurality of storage units may be a paper sheet storage cassette and at least one other storage unit is a paper sheet storage bag.

In the paper sheet handling machine as described above, the predetermined classification condition may be such a condition that a banknote out of the paper sheet is classified into a fit note of the banknote and an unfit note or counterfeit note of the banknote.

Alternatively, the predetermined classification condition may be a condition for classifying a banknote out of the paper sheet into a banknote to be used for replenishment and a banknote to be collected.

In this case, the banknote to be used for replenishment may be stored in a paper sheet storage cassette among the plurality of storage units, and the banknote to be collected is stored in a paper sheet storage bag among the plurality of storage units.

Alternatively, the predetermined classification condition may be such a condition that a banknote out of the paper sheet is classified into a banknote to be used for reconciliation of a store in which the paper sheet handling machine is installed and a banknote to be collected.

Alternatively, the predetermined classification condition may be such a condition that a banknote out of the paper sheet is classified into a banknote to be used for reconciliation of a current day and a banknote to be used for reconciliation of a next day.

Alternatively, the predetermined classification condition may be such a condition that a banknote out of the paper sheet is classified into a banknote for which depositing process is reconciled and a banknote that is deposited after a closing balance process.

Alternatively, the predetermined classification condition may be a condition for classifying a banknote out of the paper sheet into a high-value banknote that is higher than a predetermined amount and a low-value banknote that is not more than the predetermined amount.

In this case, the high-value banknote that is higher than the predetermined amount may be stored in a paper sheet storage bag among the plurality of storage units, and the low-value banknote that is not more than the predetermined amount may be stored in a paper sheet storage cassette among the plurality of storage units.

Alternatively, the predetermined classification condition may be such a condition that the paper sheet is classified into a banknote and the paper sheet other than the banknote.

Alternatively, the predetermined classification condition may be a condition for classifying a banknote out of the paper sheet into a banknote issued by a home country or an organization related to the home country and a banknote issued by a country or organization other than the home country.

Alternatively, the predetermined classification condition may be a condition for classifying a banknote out of the paper sheet into a banknote until reaching a predetermined total amount in one transaction and a banknote after reaching the predetermined total amount in one transaction.

In the paper sheet handling machine as described above, the controlling unit may perform control so that all the paper sheets to be sent from the transporting unit of the upper assembly to the lower assembly are stored in a specific storage unit designated in advance in a mixed state, when a predetermined switching condition is satisfied at the time of sorting the paper sheet, to be sent from the transporting unit of the upper assembly to the lower assembly, to each of the storage units.

In this case, the predetermined switching condition may be a condition in which the number of the deposited banknote of a specific denomination designated in advance exceeds a predetermined number designated in advance, and the controlling unit may perform control so that the paper sheet, to be sent from the transporting unit of the upper assembly to the lower assembly, is stored in the specific storage unit designated in advance other than the storage unit in which the banknote of the specific denomination designated in advance is to be stored, after the predetermined switching condition is satisfied.

Alternatively, the predetermined switching condition may be a condition in which a certain storage unit becomes in a full state or near-full state, and the controlling unit performs control so that the paper sheet, to be sent from the transporting unit of the upper assembly to the lower assembly, is stored in the specific storage unit designated in advance other than the storage unit which has become in the full state or near-full state, after the predetermined switching condition is satisfied.

Further, when the controlling unit performs control so that all the paper sheets to be sent from the transporting unit of the upper assembly to the lower assembly are stored in the specific storage unit designated in advance, the control unit may perform control so as to enable storage of the paper sheet in the storage unit other than the specific storage unit designated in advance at a predetermined timing.

In the paper sheet handling machine as described above, a storage/feeding unit for storing the paper sheet sent from the transporting unit and capable of feeding out the stored paper sheet to the transporting unit may be provided in the upper assembly.

In this case, the control unit may perform control so as to store a type of the paper sheet not allocated to each storage unit in the storage/feeding unit.

Further, the control unit may perform control so as to feed out the paper sheet stored in the storage/feeding unit and send the fed paper sheet to the ejecting unit, when receiving a collection instruction of the paper sheet.

Further, the control unit may perform control so as to store the paper sheet, in which the corresponding storage unit is in a full state or near-full state, in the storage/feeding unit.

Further, the paper sheet handling machine as described above may further include a memory unit, and the control unit may perform control so as to associate information on the paper sheet stored in the storage/feeding unit with an order in which the paper sheet is stored in the storage/feeding unit, and store associated information in the memory unit.

In this case, the control unit may perform control so as to store the paper sheet, in which the corresponding storage unit is in the full state or near-full state, in the storage/feeding unit, and feed out the paper sheet from the storage/feeding unit when the corresponding storage unit becomes a state that is not the full state or near-full state, and then store the paper sheet fed out from the storage/feeding unit in the corresponding storage unit based on information stored in the memory unit.

DETAILED DESCRIPTION OF THE INVENTION

Figure 1:
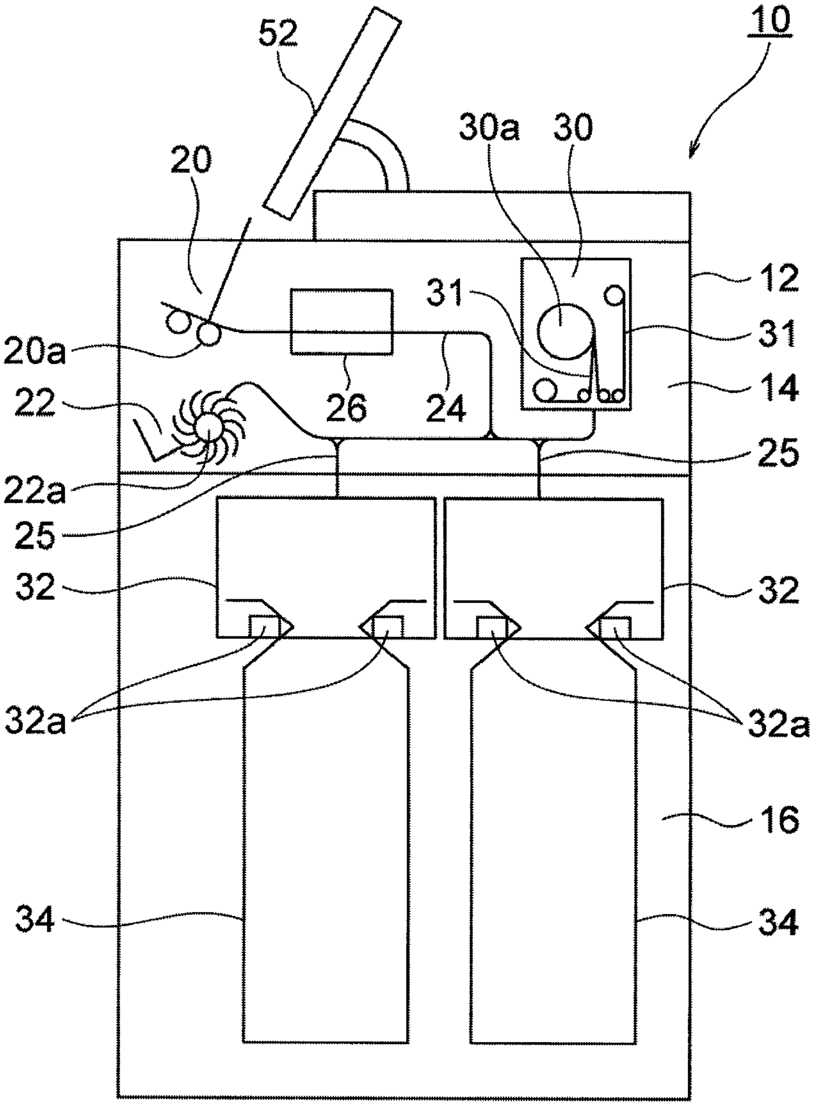
FIG. 1 is a schematic configuration view showing an example of a configuration of a banknote handling machine according to an embodiment of the present invention.
Figure 2:
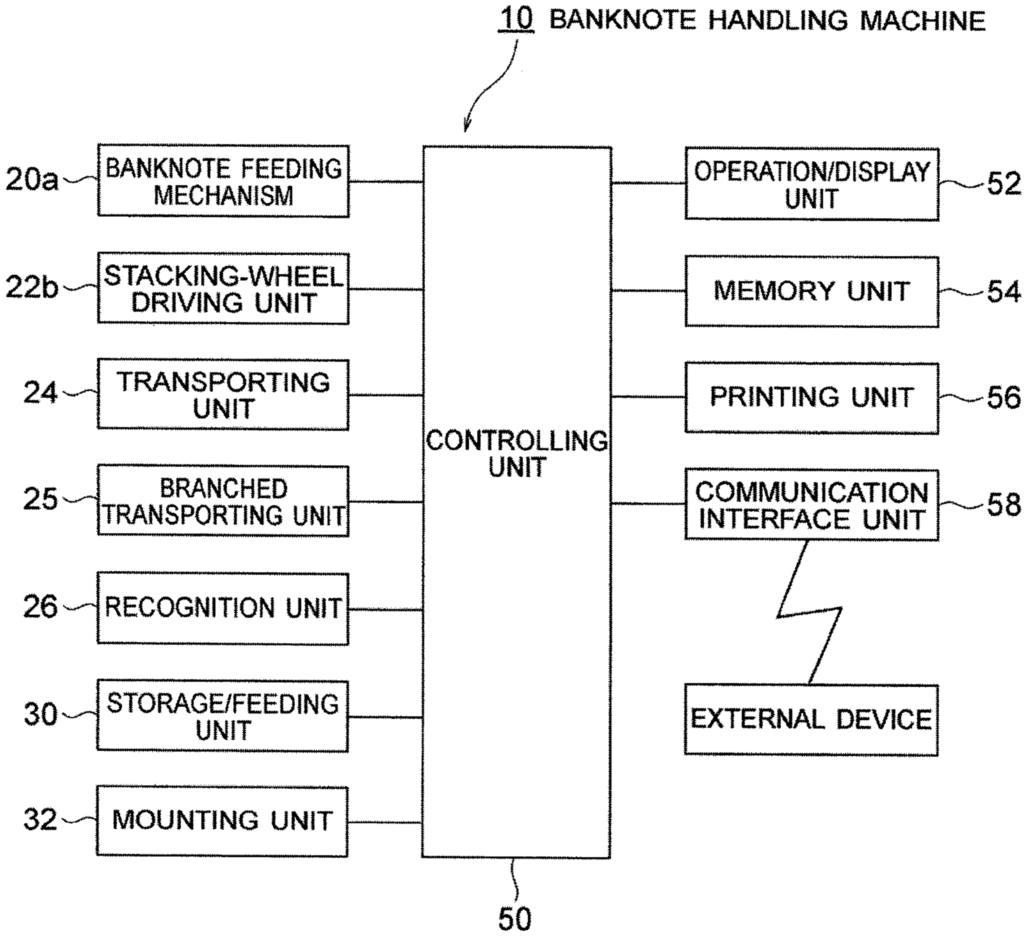
FIG. 2 is a functional block diagram showing a configuration of a control system of the banknote handling machine shown in FIG. 1.
Figure 3:
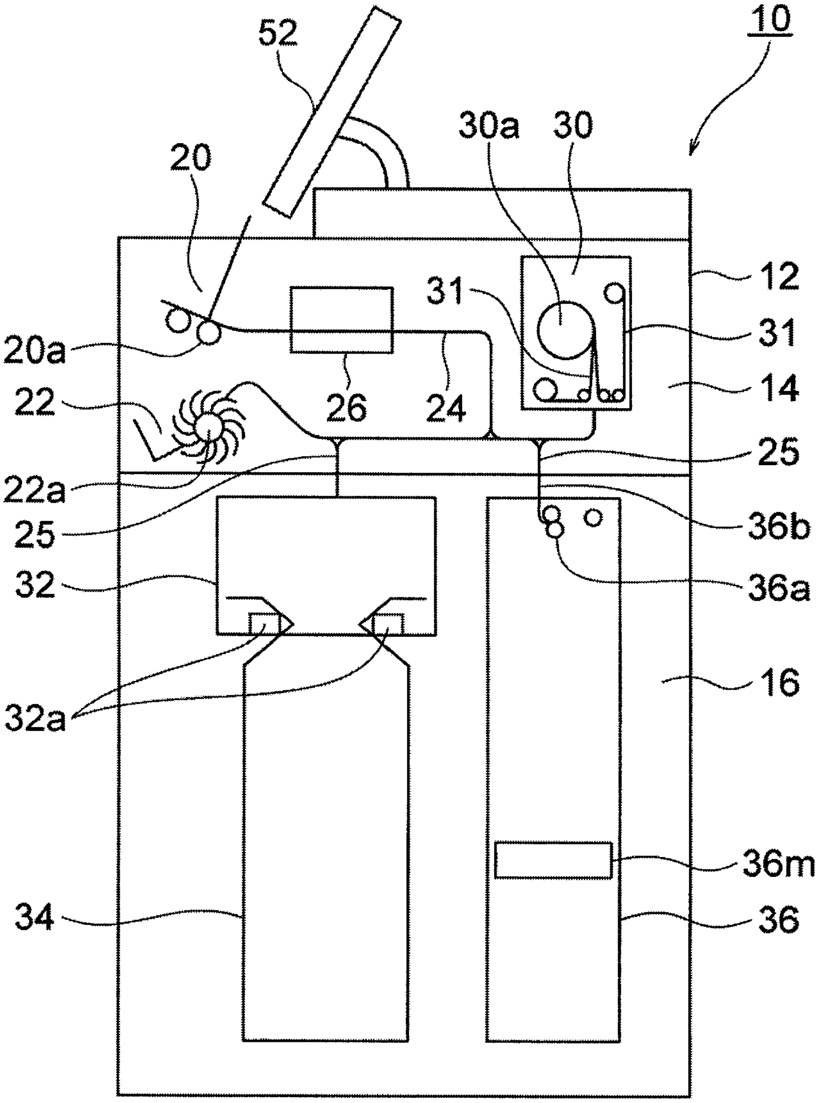
FIG. 3 is a schematic configuration view showing a state in which a banknote storage bag and a banknote storage cassette are respectively mounted on a lower assembly in the banknote handling machine shown in FIG. 1.
Figure 4:
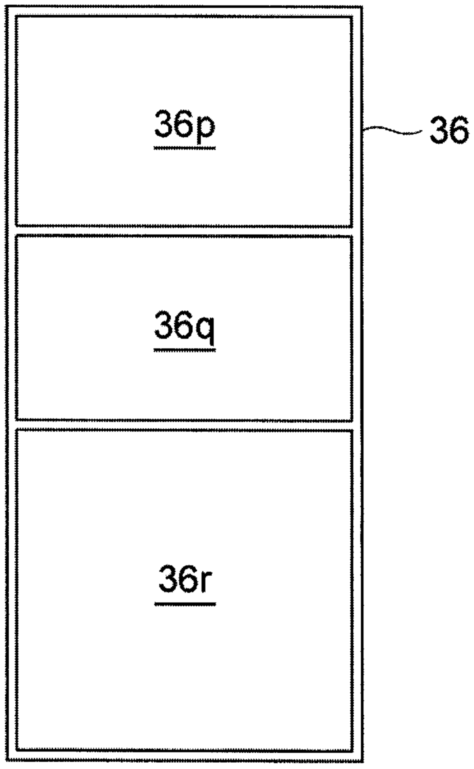
FIG. 4 is a view showing an example of a configuration of the banknote storage cassette to be mounted on the lower assembly of the banknote handling machine shown in FIG. 1.

Exemplary embodiments of the present invention are explained below with reference to the accompanying drawings. FIGS. 1 to 4 depict a banknote handling machine according to one embodiment of the present invention. Among these drawings, FIG. 1 is a schematic configuration view showing an example of a configuration of the banknote handling machine according to the present embodiment, and FIG. 2 is a functional block diagram showing a configuration of a control system of the banknote handling machine shown in FIG. 1. FIG. 3 is a schematic configuration view showing a state in which a banknote storage bag and a banknote storage cassette are respectively mounted on a lower assembly in the banknote handling machine shown in FIG. 1, and FIG. 4 is a view showing an example of a configuration of the banknote storage cassette to be mounted on the lower assembly of the banknote handling machine shown in FIG. 1.

A banknote handling machine 10 according to the present embodiment is generally arranged in a front area or a backyard area of a store such as a supermarket and the like, and the banknote handling machine 10 can perform various processes such as a depositing process, dispensing process, exchanging process and the like of the banknotes. As shown in FIG. 1, the banknote handling machine 10 according to the present embodiment has a substantially rectangular parallelepiped housing 12. A left side surface of the housing 12 in FIG. 1 is a front surface of the housing 12 (that is, the surface facing an operator). Inside the housing 12, an upper assembly 14 and a lower assembly 16 are accommodated such that the upper assembly 14 and the lower assembly 16 can be respectively drawn forward from the front surface of the housing 12 (specifically, to the left in FIG. 1). It is to be noted that the lower assembly 16 may be drawn backward from a rear surface of the housing 12 (specifically, to the right in FIG. 1) instead of drawing it forward from the front surface of the housing 12. In the upper assembly 14, an inlet unit 20 such as a receiving hopper for putting the banknotes into inside of the housing 12 from outside is provided on an upper part of the front surface of the housing 12 (the upper part of the left side surface in FIG. 1). Further, in the upper assembly 14, an ejecting unit 22 for ejecting the banknotes from inside of the housing 12 to outside is provided below the inlet unit 20 in the front surface of the housing 12 (the surface on the left side in FIG. 1).

The inlet unit 20 is provided with a banknote feeding mechanism 20*a* for feeding out the banknotes in a stacked manner put by the operator on the inlet unit 20, one by one into the housing 12. In the upper assembly 14, inside the housing 12 of the banknote handling machine 10, there is provided a transporting unit 24 for transporting the banknote one by one in the housing 12. The banknote fed out from the inlet unit 20 by the banknote feeding mechanism 20*a* is transported one by one by the transporting unit 24. The transporting unit 24 is provided with a recognition unit 26. The banknote fed out to the transporting unit 24 by the banknote feeding mechanism 20*a* is recognized by the recognition unit 26 for its denomination, authenticity, front/back (whether face side up or back side up), fitness, version (new/old), transportation state, and the like. The recognition unit 26 includes, for example, an image sensor, and a serial number of the banknote is acquired based on the image of the banknote taken by the image sensor. Information related to the serial number of the banknote acquired by the recognition unit 26 is stored in a memory unit 54 described below. In this way, the serial number corresponding to each banknote stored in a banknote storage bag 34 such as a pouch bag, a banknote storage cassette 36, a storage/feeding unit 30 and the like described below is stored in the memory unit 54.

As shown in FIG. 1, the ejecting unit 22 is connected to the transporting unit 24, and the banknote sent from the transporting unit 24 to the ejecting unit 22 is stacked in the ejecting unit 22. The ejecting unit 22 is accessible from outside of the housing 12 so that the operator can take out the banknotes stacked in the ejecting unit 22 from the front surface of the housing 12. A stacking wheel 22*a* is provided at a connection point between the transporting unit 24 and the ejecting unit 22, and the stacking wheel 22*a* is adapted to rotate in a counterclockwise direction in FIG. 1. When the banknote is sent from the transporting unit 24 to the ejecting unit 22, the stacking wheel 22*a* rotates in the counterclockwise direction in FIG. 1 in a state in which the banknote is held between two blades in the stacking wheel 22*a*. Then, the banknote held between the two blades of the stacking wheel 22*a* is stacked in the ejecting unit 22 in an aligned state.

In the upper assembly 14, the transporting unit 24 is provided with the storage/feeding unit 30 of a tape-type. The banknote sent from the transporting unit 24 to the storage/feeding unit 30 is stored in the storage/feeding unit 30 and the banknotes stored in the storage/feeding unit 30 can be fed out one by one to the transporting unit 24. More specifically, the storage/feeding unit 30 is provided with a drum 30*a* rotatable in both forward and reverse directions, and one end of a pair of band-shaped tapes 31 is connected to an outer peripheral surface of the drum 30*a*. When the banknote is sent from the transporting unit 24 to the storage/feeding unit 30, the banknote is wound on the drum 30*a* by each band-shaped tape 31 such that the banknote and each band-shaped tape 31 are integrally wound on the drum 30*a*. On the other hand, when each tape 31 is rewound from the drum 30*a* by rotating the drum 30*a* in the reverse direction, the banknote wound on the drum 30*a* is discharged from each tape 31 and is fed out to the transporting unit 24.

In the lower assembly 16, there are provided a plurality of (two in the example shown in FIG. 1) mounting units 32, on which the banknote storage bag 34 such as pouch bag can be mounted, in parallel. Each mounting unit 32 is provided with a pair of holding members 32*a* spaced apart from each other so as to face each other, and two opposed positions in the vicinity of an opening of the banknote storage bag 34 are respectively held by the holding members 32*a*. One holding member 32*a* is fixed in its position while the other holding member 32*a* is movable toward one holding member 32*a*. In addition, a heating member is provided in each holding member 32*a*. Then, after the banknotes are stored in the banknote storage bag 34 mounted on the mounting unit 32, the other holding member 32*a* moves toward one holding member 32*a* and these holding members 32*a* are contacted to each other. Thereafter, heat is applied to the location near the opening of the banknote storage bag 34 by the heating member so that the opening of the banknote storage bag 34 is sealed by heat. It should be noted that in each mounting unit 32, instead of moving one holding member 32*a* of the pair of holding members 32*a* toward the other holding member 32*a*, both holding members 32*a* may move towards the other holding member 32*a* so that these holding members 32*a* are contacted to each other.

Although not shown in FIG. 1, in each mounting unit 32, above the pair of holding members 32*a*, an escrow unit for temporarily escrowing the banknotes sent from the transporting unit 24 and a pushing plate for pushing the banknotes escrowed on the escrowing unit into the banknote storage bag 34 are respectively provided. More specifically, the banknotes sent from the transporting unit 24 to each mounting unit 32 are stacked in a stacked state on the escrow unit. When storing the banknotes stacked in a stacked state on the escrow unit in the banknote storage bag 34, as the pushing plate moves downward, the banknotes stacked on the escrow unit are pushed downward and sent to inside of the banknote storage bag 34. Further, when a predetermined number of the banknotes are stored in the banknote storage bag 34, the pushing plate moves downward and enters inside of the banknote storage bag 34, and the banknotes stored in the banknote storage bag 34 are pressed downward by the pushing plate and compressed.

The operator can take out the banknote storage bag 34 in which the banknotes are stored from the mounting unit 32 or can mount the empty banknote storage bag 34 on the mounting unit 32 by drawing the lower assembly 16 forward from the front surface of the housing 12 (to the left in FIG. 1).

In the upper assembly 14, a plurality of (two in the example shown in FIG. 1) branched transporting units 25 are branched from the transporting unit 24 so as to correspond to each mounting unit 32. The banknote branched from the transporting unit 24 to the branched transporting unit 25 is sent from this branched transporting unit 25 to the banknote storage bag 34 mounted on each mounting unit 32 so as to be stored in the banknote storage bag 34.

In the banknote handling machine 10 of the present embodiment, the lower assembly 16 is housed in a safe and only a person having a specific authority (for example, a security guard staff of an security transportation company and the like who collects the banknote storage bag 34 from the lower assembly 16) can open a door of the safe and draw the lower assembly 16 forward from the front surface of the housing 12. Alternatively, only a responsible person of the store may open the door of the safe so that the lower assembly 16 can be drawn forward from the front surface of the housing 12.

The banknote handling machine 10 of the present embodiment is provided with a controlling unit 50 for controlling each constituent member of the banknote handling machine 10. More specifically, as shown in FIG. 2, the banknote feeding mechanism 20*a* provided in the inlet unit 20, a stacking-wheel driving unit 22*b* for driving the stacking wheel 22*a* provided in the ejecting unit 22, the transporting unit 24, the branched transporting units 25, the recognition unit 26, the storage/feeding unit 30, the mounting units 32 and the like are communicably connected to the controlling unit 50, respectively. A signal relating to a recognition result of the banknote by the recognition unit 26 is sent to the controlling unit 50 and the controlling unit 50 sends a command signal to each constituent member of the banknote handling machine 10 so as to control the operation of these constituent members.

As shown in FIG. 2, an operation/display unit 52, the memory unit 54, a printing unit 56 and a communication interface unit 58 are communicably connected to the controlling unit 50. As shown in FIG. 1, the operation/display unit 52 is composed of a touch panel and the like provided on the upper surface of the housing 12. Information on the process status such as the depositing process, dispensing process and the like in the banknote handling machine 10 and information on an amount of the banknotes stored in each banknote storage bag 34 and the like are displayed on the operation/display unit 52. In addition, the operator can give various instructions to the controlling unit 50 by operating the operation/display unit 52. Further, the operator may set a predetermined classification condition described below by operating the operation/display unit 52.

In the memory unit 54, a process history of the banknotes such as the depositing process, dispensing process and the like in the banknote handling machine 10, and information on the amount of the banknotes stored in each banknote storage bag 34 and the like are stored. Further, as described above, the memory unit 54 stores the serial number corresponding to each banknote stored in the banknote storage bag 34 such as a pouch bag and the like, the banknote storage cassette 36 (described below), the storage/feeding unit 30 and the like. The printing unit 56 prints the process history of the banknotes such as the depositing process, dispensing process and the like in the banknote handling machine 10, or information on the amount of the banknotes stored in each banknote storage bag 34 and the like on a receipt and the like. Further, the controlling unit 50 transmits/receives signals to/from an external device (specifically, for example, an upper terminal) provided separately from the banknote handling machine 10 according to the present embodiment via the communication interface unit 58. For example, when the banknote storage bag 34 or the banknote storage cassette 36 (described below) is collected by the security guard staff of the security transportation company and the like, the controlling unit 50 transmits information on the banknote storage bag 34 or the banknote storage cassette 36 via the communication interface unit 58 to the security transportation company.

Next, the operation of the banknote handling machine 10 having such a configuration will be described. It should be noted that the operation of the banknote handling machine 10 as described below is performed by the controlling unit 50 controlling each constituent member of the banknote handling machine 10.

First, the operation of the depositing process of the banknotes in the banknote handling machine 10 will be described. After the operator puts the banknotes into the inlet unit 20, when the operator gives an instruction to start the depositing process to the controlling unit 50 by operation/display unit 52, the banknote put into the inlet unit 20 is fed out to inside of the housing 12 one by one by the banknote feeding mechanism 20*a* and is transported one by one by the transporting unit 24. The banknote being transported by the transporting unit 24 is recognized by the recognition unit 26 in terms of its denomination, authenticity, front/back (whether face side up or back side up), fitness, version (new/old), transportation state, and the like. In addition, the banknote is imaged by the image sensor of the recognition unit 26, and the serial number of the banknote is acquired based on the image of the banknote. Then, information on the serial number of the banknote acquired by the recognition unit 26 is stored in the memory unit 54. The banknote recognized by the recognition unit 26 as not being a normal banknote, that is, a reject banknote, is sent to the ejecting unit 22 by the transporting unit 24 and stacked in the ejecting unit 22. This allows the operator to manually take out the reject banknote stacked in the ejecting unit 22 from the front surface of the housing 12 and put it into the inlet unit 20 again.

On the other hand, the banknote recognized as a normal banknote by the recognition unit 26 is branched from the transporting unit 24 to the branched transporting unit 25 and sent from the branched transporting unit 25 to the banknote storage bag 34. Details on which of the two banknote storage bags 34 the banknote recognized by the recognition unit 26 is sent will be described below.

If the banknote storage bag 34 to which the banknote recognized by the recognition unit 26 is to be sent is in a full state or near-full state and it is not possible to store the banknote in this banknote storage bag 34, the banknote recognized by the recognition unit 26 is sent to the storage/feeding unit 30 and stored in this storage/feeding unit 30. Then, when the banknote storage bag 34 in the full state or near-full state is taken out from the mounting unit 32 of the lower assembly 16 by the security guard staff of the security transportation company and the like and the empty banknote storage bag 34 is mounted on the mounting unit 32, the banknote is fed out to the transporting unit 24 one by one from the storage/feeding unit 30, and the banknote fed out from the storage/feeding unit 30 is sent to the banknote storage bag 34 by the transporting unit 24.

In the banknote handling machine 10 according to the present embodiment, the controlling unit 50 performs control to sort each banknote, to be sent from the transporting unit 24 of the upper assembly 14 to the lower assembly 16, to each of the banknote storage bags 34 based on the predetermined classification condition designated in advance. As the predetermined classification condition, various conditions as described below can be applied. Examples of these various conditions will be described below.

The predetermined classification condition may be a condition that classifies each banknote into a fit note of the banknote and an unfit note or counterfeit note of the banknote. Specifically, when the banknote recognized by the recognition unit 26 is the fit note, this banknote is sent to the banknote storage bag 34 on the left side in FIG. 1 by the transporting unit 24. On the other hand, in the case where the banknote recognized by the recognition unit 26 is the unfit note or the counterfeit note, this banknote is sent to the banknote storage bag 34 on the right side in FIG. 1 by the transporting unit 24.

The predetermined classification condition may be a condition that classifies each banknote into a banknote to be used for replenishment and a banknote to be collected by the security guard staff of the security transportation company and the like. The banknote to be used for replenishment is a banknote to be recycled in the store where the banknote handling machine 10 according to the present embodiment is installed. Specifically, the banknote to be used for replenishment is the banknote to be replenished in devices such as automatic teller machine (ATM), banknote deposit/dispense machine for bank counter (TCR), cash change machine for register, rear deposit/dispense machine, and the like, respectively installed in the store. In the predetermined classification condition, as a banknote to be used for replenishment, the fit note is generally specified. In the present embodiment, when the banknote is recognized by the recognition unit 26, the banknote judged by the controlling unit 50 as the banknote to be used for replenishment is sent to the banknote storage bag 34 on the left side in FIG. 1 by the transporting unit 24. On the other hand, when the banknote is recognized by the recognition unit 26, if the banknote recognized by the recognition unit 26 is the banknote to be collected by the security guard staff of the security transportation company and the like, this banknote is sent to the banknote storage bag 34 on the right side in FIG. 1 by the transporting unit 24. Further, in the present embodiment, as the predetermined classification condition, it is possible to set up the banknotes to be used for replenishment (the fit note) by designating only a specific denomination.

The predetermined classification condition may be such a condition that each banknote is classified into the banknote to be used for reconciliation of the store in which the banknote handling machine 10 is installed and the banknote to be collected by the security guard staff of the security transportation company and the like. Specifically, when the banknote is recognized by the recognition unit 26, the banknote judged by the controlling unit 50 as being the banknote to be used for reconciliation of the store in which the banknote handling machine 10 is installed is sent to the banknote storage bag 34 on the left side in FIG. 1 by the transporting unit 24. On the other hand, when the banknote is recognized by the recognition unit 26, the banknote judged by the controlling unit 50 as being the banknote to be collected by the security guard staff of the security transportation company and the like is sent to the banknote storage bag 34 on the right side in FIG. 1 by the transporting unit 24.

The predetermined classification condition may be such a condition that the banknote is classified into the banknote to be used for reconciliation of a current day and the banknote to be used for reconciliation of a next day. Specifically, when the banknote is recognized by the recognition unit 26, the banknote judged by the controlling unit 50 as being the banknote to be used for reconciliation of the current day is sent to the banknote storage bag 34 on the left side in FIG. 1 by the transporting unit 24. On the other hand, when the banknote is recognized by the recognition unit 26, the banknote judged by the controlling unit 50 as being the banknote to be used for reconciliation of the next day is sent to the banknote storage bag 34 on the right side in FIG. 1 by the transporting unit 24.

The predetermined classification condition may be such a condition that the banknote is classified into a banknote for which depositing process is reconciled (i.e. the banknote of which the closing balance process has conducted) and a banknote that is deposited after the closing balance process. The latter "banknote that is deposited after the closing balance process" is the banknote as sales proceeds deposited in the banknote handling machine 10 on the current day after the reconciliation of payment on this day is confirmed. In the present embodiment, when the banknote is recognized by the recognition unit 26, the banknote judged by the controlling unit 50 as being the banknote for which depositing process is reconciled (i.e. the banknote of which the closing balance process has conducted) is sent to the banknote storage bag 34 on the left side in FIG. 1 by the transporting unit 24. On the other hand, when the banknote is recognized by the recognition unit 26, the banknote judged by the controlling unit 50 as being the banknote that is deposited after the closing balance process is sent to the banknote storage bag 34 on the right side in FIG. 1 by the transporting unit 24.

The predetermined classification condition may be a condition for classifying the banknote into a high-value banknote that is higher than a predetermined amount and a low-value banknote that is not more than the predetermined amount. Specifically, when the banknote is recognized by the recognition unit 26, the banknote judged by the controlling unit 50 as being the high-value banknote that is higher than the predetermined amount is sent to the banknote storage bag 34 on the left side in FIG. 1 by the transporting unit 24. On the other hand, when the banknote is recognized by the recognition unit 26, the banknote judged by the controlling unit 50 as being the low-value banknote that is not more than the predetermined amount is sent to the banknote storage bag 34 on the right side in FIG. 1 by the transporting unit 24.

The predetermined classification condition may be such a condition that a paper sheet is classified into the banknote and the paper sheet other than the banknote (for example, gift voucher, check and the like). Specifically, if the recognition unit 26 is capable of recognizing gift voucher, check and the like other than banknote, the paper sheet recognized by the recognition unit 26 as being the banknote is sent to the banknote storage bag 34 on the left side in FIG. 1 by the transporting unit 24. On the other hand, the paper sheet recognized by the recognition unit 26 as being the paper sheet other than the banknote is sent to the banknote storage bag 34 on the right side in FIG. 1 by the transporting unit 24. The paper sheet recognized by the recognition unit 26 as being neither the banknote nor the predetermined paper sheet is sent to the ejecting unit 22 by the transporting unit 24 and returned to the operator.

The predetermined classification condition may be a condition for classifying the banknote into a banknote issued by a home country or an organization related to the home country (domestic note) and a banknote issued by a country or organization other than the home country (national note). Specifically, when the banknote is recognized by the recognition unit 26, the banknote judged by the controlling unit 50 as being the banknote issued by the home country or the organization related to the home country is sent to the banknote storage bag 34 on the left side in FIG. 1 by the transporting unit 24. On the other hand, when the banknote is recognized by the recognition unit 26, the banknote judged by the controlling unit 50 as being the banknote issued by the country or organization other than the home country is sent to the banknote storage bag 34 on the right side in FIG. 1 by the transporting unit 24.

The predetermined classification condition may be a condition for classifying the banknote into a banknote until reaching a predetermined total amount in one transaction (specifically, an insurance amount) and a banknote after reaching the predetermined total amount in one transaction. More specifically, when one banknote is recognized by the recognition unit 26, the total amount of the banknotes which have been recognized so far by the recognition unit 26 in one transaction is managed by the controlling unit 50. Then, when some banknote is recognized by the recognition unit 26, if the total amount of the banknotes (including this banknote) recognized so far by the recognition unit 26 in one transaction is less than a predetermined insurance amount, such a banknote is sent to the banknote storage bag 34 on the left side in FIG. 1 by the transporting unit 24. On the other hand, when one banknote is recognized by the recognition unit 26, if the total amount of the banknotes (including this banknote) recognized so far by the recognition unit 26 in one transaction exceeds the predetermined insurance amount, such a banknote is sent to the banknote storage bag 34 on the right side in FIG. 1 by the transporting unit 24. When the banknote is classified in this manner, the banknotes corresponding to the predetermined insurance amount can be stored in the banknote storage bag 34 on the left side in FIG. 1, so that it is easy to manage the banknotes corresponding to the predetermined insurance amount.

As described above, in the banknote handling machine 10 according to the present embodiment, based on various classification conditions, each banknote sent from the transporting unit 24 of the upper assembly 14 to the lower assembly 16 can be sorted to each of the banknote storage bags 34. As a result, the banknotes stored in the plurality of the banknote storage bags 34 can be used for different purposes for each banknote storage bag 34. Further, since it is not necessary to sort the banknotes in post-process, it is possible to reduce the burden on work for the operator. In the banknote handling machine 10 according to the present embodiment, the classification condition concerning sorting of the banknotes to each banknote storage bag 34 can be arbitrarily set by the operation/display unit 52. Further, in the banknote handling machine 10 according to the present embodiment, when the amount of the banknotes stored in any banknote storage bag 34 among a plurality of (for example, two) banknote storage bags 34 reaches a predetermined reference amount (for example, insurance applicable amount, regulated amount and the like), controlling unit 50 performs control to prohibit sending the banknote from the transporting unit 24 of the upper assembly 14 to this banknote storage bag 34 and send the banknote to other banknote storage bag 34.

As the banknote storage bag 34, those having different sizes may be respectively mountable on the mounting unit 32 of the lower assembly 16. For example, when the security guard staff of the security transportation company and the like collects the banknote storage bag 34 from the banknote handling machine 10 according to the present embodiment, a large-sized vehicle or a small-sized vehicle may be used. In such a case, the banknote storage bag 34 having a relatively large size corresponding to the large-sized vehicle and the banknote storage bag 34 having a relatively small size corresponding to the small-sized vehicle can be respectively mounted on each mounting unit 32 of the lower assembly 16. In general, the reference amount of the banknote storage bag 34 for the large-sized vehicle is larger than the reference amount of the banknote storage bag 34 for the small-sized vehicle. For this reason, it is preferable that the operator can input the reference amount of the banknote storage bag 34 mounted on each mounting unit 32 for each banknote storage bag 34 to the controlling unit 50 by the operation/display unit 52. In this case, the controlling unit 50 performs control to send each banknote from the transporting unit 24 of the upper assembly 14 to each banknote storage bag 34 based on the reference amount allocated to each banknote storage bag 34. Further, the size of the banknote storage bag 34 to be mounted on each mounting unit 32 can be determined based on the collection route of the banknote storage bag 34 from each store in place of information on the transport vehicle (i.e. the large-sized vehicle, the small-sized vehicle and the like).

Note that the banknote handling machine 10 according to the present embodiment is not limited to the configuration in which two banknote storage bags 34 are mounted on the lower assembly 16 as shown in FIG. 1. As shown in FIG. 3, as the banknote handling machine 10 according to the present embodiment, one having a configuration in which one banknote storage bag 34 and one banknote storage cache 36 are mounted in parallel on the lower assembly 16 may be used. In the banknote handling machine 10 as shown in FIG. 3, the banknote branched from the transporting unit 24 of the upper assembly 14 to the branched transporting unit 25 is sent from the branched transporting unit 25 to the banknote storage cassette 36 mounted on the lower assembly 16. In the banknote storage cassette 36, the banknotes are stored in a stacked state. More specifically, within the banknote storage cassette 36, a stage **36*m* that is movable up and down is provided, and the banknote sent from the branched transporting unit 25 to the banknote storage cassette 36 is stacked on the stage 36*m* in the stacked state. A banknote feeding mechanism 36*a* is provided at a top of the banknote storage cassette 36 so that the banknotes stored in the banknote storage cassette 36 can be fed out one by one to the transporting unit 24 of the upper assembly 14 by the banknote feeding mechanism 36*a*. More specifically, when the banknote is fed out from the banknote storage cassette 36, as the stage 36*m* rises, the banknote positioned at an uppermost layer among the plurality of banknotes stacked on the stage 36*m* is sequentially sent to the transporting unit 24 from the branched transporting unit 25 via a transportation path 36*b* by the banknote feeding mechanism 36*a***.

In addition, by drawing the lower assembly 16 forward from the front surface of the housing 12, the operator can take out the banknote storage cassette 36 in which the banknotes are stored from the lower assembly 16 or mount the empty banknote storage cassette 36 on the lower assembly 16.

In the banknote handling machine 10 shown in FIG. 3, similarly to the banknote handling machine 10 shown in FIG. 1, the controlling unit 50 controls transporting unit 24 to sort each banknote, sent from the transporting unit 24 of the upper assembly 14 to the lower assembly 16, to one of the banknote storage bag 34 and the banknote storage cassette 36 based on the predetermined classification condition designated in advance. The "predetermined classification condition designated in advance" is the same as the classification condition described above regarding the banknote handling machine 10 shown in FIG. 1.

In the banknote handling machine 10 shown in FIG. 3, if the predetermined classification condition is the condition that classifies the banknote into the banknote to be used for replenishment and the banknote to be collected by the security guard staff of the security transportation company and the like, the banknote judged by the controlling unit 50 as the banknote to be used for replenishment is sent to the banknote storage cassette 36 by the transporting unit 24. On the other hand, when the banknote recognized by the recognition unit 26 is the banknote to be collected by the security guard staff of the security transportation company and the like, this banknote is sent to the banknote storage bag 34 by the transporting unit 24. As described above, in such a predetermined classification condition, the fit note is generally designated as the banknote to be used for replenishment. With respect to the banknote to be used for replenishment, by storing this banknote in the banknote storage cassette 36, when the banknote handling machine 10 performs the dispensing process of the banknotes, the banknotes can be fed out from the banknote storage cassette 36 to the transporting unit 24 of the upper assembly 14 and sent to the ejecting unit 22. Therefore, the operator can replenish the banknote stacked in the ejecting unit 22 to another device such as the automated teller machine and the like installed in the store. Further, in the present embodiment, by taking out the banknote storage cassette 36 that stores the banknotes to be used for replenishment from one banknote handling machine 10 and mounting it on another banknote handling machine 10, the banknote replenishment in another banknote handling machine 10 can be performed. Further, by taking out the banknote storage cassette 36 that stores the banknote to be used for replenishment from one banknote handling machine 10 and mounting it on another device such as the banknote deposit/dispense machine for bank counter, the banknotes stored in this banknote storage cassette 36 can be replenished to another device. Further, in the case where the banknote storage cassette 36 in which the banknotes to be used for replenishment (fit note), designated only with a specific denomination, are stored is mounted on another device such as the banknote deposit/dispense machine for bank counter, the banknotes stored in the banknote storage cassette 36 can be used for dispense in another device. When the banknote storage cassette 36 in which the banknotes to be used for replenishment are stored is mounted on another device, information on the serial numbers of the banknotes stored in the banknote storage cassette 36 may be transferred from the controlling unit 50 to the another device by the communication interface unit 58. Alternatively, a memory unit (not shown) such as a memory may be provided in the banknote storage cassette 36, and information on the serial numbers of the banknotes stored in the banknote storage cassette 36 may be written in this memory unit. In this case, when mounting the banknote storage cassette 36 in which the banknotes used for replenishment are stored on another device, since information stored in the memory unit provided in the banknote storage cassette 36 is read by this other device, information on the serial numbers of the banknotes stored in the banknote storage cassette 36 are acquired by another device. On the other hand, as for the banknotes to be collected by the security guard staff of the security transportation company and the like, by storing these banknotes in the banknote storage bag 34, the security guard staff of the security transportation company and the like can collect the banknotes together with the banknote storage bag 34.

In the banknote handling machine 10 shown in FIG. 3, if the predetermined classification condition is the condition for classifying the banknote into the high-value banknote that is higher than the predetermined amount and the low-value banknote that is not more than the predetermined amount, the banknote judged by the controlling unit 50 as the high-value banknote that is higher than the predetermined amount is sent to the banknote storage bag 34 by the transporting unit 24. On the other hand, when the banknote recognized by the recognition unit 26 is the low-value banknote that is not more than the predetermined amount, this banknote is sent to the banknote storage cassette 36 by the transporting unit 24. Since the low-value banknote that is not more than the predetermined amount is stored in the banknote storage cassette 36, when the depositing process is performed in the banknote handling machine 10, it becomes possible to feed out the low-value banknote as change from the banknote storage cassette 36 to the transporting unit 24 of the upper assembly 14 and send it to the ejecting unit 22. Therefore, the operator can replenish the low-value banknote stacked in the ejecting unit 22 to the cash change machine and the like provided in the store as a change. Alternatively, by mounting the banknote storage cassette 36 that stores the low-value banknote collected from a certain banknote handling machine 10 to another banknote handling machine 10, it is possible to replenish the low-value banknote in this another banknote handling machine 10. On the other hand, for the high-value banknote that is higher than the predetermined amount, such banknotes are not suitable for replenishment as a change to the cash change machine and the like provided in the store. Therefore, by storing them in the banknote storage bag 34, the security guard staff of the security transportation company and the like can collect the high-value banknotes together with the banknote storage bag 34.

In the case the banknote storage cassette 36 is mounted on the lower assembly 16 in the banknote handling machine 10 according to the present embodiment, as shown in FIG. 4, the banknote storage cassette 36 whose inside is partitioned into a plurality of areas 36*p*, 36*q* and 36*r* may be mounted on the lower assembly 16. More specifically, when the banknotes are handed over between the banknote handling machine 10 according to the present embodiment and a money teller machine arranged at the back office and the like of the store, for example, by the banknote storage cassette 36, by dividing the inside of the banknote storage cassette 36 into the plurality of areas 36*p*, 36*q* and 36*r*, it is possible to carry the banknotes from the banknote handling machine 10 to the money teller machine while the banknotes are classified into a plurality of types. In detail, when the banknotes are handed over between the banknote handling machine 10 according to the present embodiment and the money teller machine as described above, the operator can not take out the banknotes from the respective areas 36*p*, 36*q* and 36*r* of the banknote storage cassette 36, so that it is possible to improve the anti-theft property. Further, as shown in FIG. 4, if the inside of the banknote storage cassette 36 is divided into the plurality of areas 36*p*, 36*q* and 36*r*, when the banknote storage cassette 36 is mounted on the lower assembly 16 of the banknote handling machine 10, the banknote can be sent from the transporting unit 24 of the upper assembly 14 of the banknote handling machine 10 to the respective areas 36*p*, 36*q*, 36*r* of the banknote storage cassette 36, respectively. Although not shown in FIG. 4, if a banknote feeding mechanism is provided in each of the areas 36*p*, 36*q* and 36*r* of the banknote storage cassette 36, the banknotes stored in each area 36*p*, 36*q* and 36*r* can be fed out to the transporting unit 24 of the upper assembly 14 of the banknote handling machine 10. When the banknote storage cassette 36 as shown in FIG. 4 is mounted on the money teller machine, the banknotes stored in each area 36*p*, 36*q* and 36*r* of the banknote storage cassette 36 can be fed out to the main part of the money teller machine.

In each area 36*p*, 36*q*, 36*r* of the banknote storage cassette 36, the type of banknote to be stored is allocated in advance. Specifically, the banknote that the operator wishes to visually check, such as the banknote with a tape, the scribbled banknote, the banknote to which a specific identification number is given, the banknote of specific type of note or denomination and the like is stored in the area 36*p*. On the other hand, the banknote that requires operator's confirmation, such as an edge folded banknote, a banknote with a needle of a staple or a clip and the like, is stored in the area 36*q*. That is, the banknote that is prone to error such as jamming, when delivered from the banknote storage cassette 36 to the main part of the money teller machine, is stored in the area 36*q*, when the banknote storage cassette 36 is mounted on the money teller machine. Further, the normal banknote is stored in the area 36*r*. When the banknote storage cassette 36 in which the above-mentioned types of banknotes are allocated to each area 36*p*, 36*q*, 36*r* is mounted on the money teller machine, the banknote fed out from the area 36*r* to the main part of the money teller machine is stored in a storage unit of the money teller machine. On the other hand, the banknote fed out from the area 36*p* to the main part of the money teller machine is sent to the rejecting unit (e.g., a first rejecting unit) and the like of the money teller machine, and then the operator can take out the banknote from the rejecting unit and the like and visually confirm the banknote. When the banknote storage cassette 36 shown in FIG. 4 is mounted on the money teller machine, if the banknote storage cassette 36 stores the banknote in the area 36*q*, the banknote stored in the area 36*q* is not fed out to the main portion of the money teller machine. Instead, information that the banknote is stored in the area 36*q* is notified to the operator by a voice guidance, a guidance display on the display unit, and the like. In another aspect, when the banknote storage cassette 36 is mounted on the money teller machine, the banknote may be fed out from the area 36*q* to the main part of the money teller machine, and the fed banknote is sent to a rejecting unit (for example, a second rejecting unit) that is different from the rejecting unit where the banknote that is fed out from the area 36*p* is sent (specifically, the first rejecting unit as described above).

According to the banknote storage cassette 36 as shown in FIG. 4, if the banknotes are handed over between the banknote handling machine 10 according to the present embodiment and the money teller machine described above, when the banknote is stored in the banknote storage cassette 36 from the upper assembly 14 of the banknote handling machine 10, it is possible to classify the banknote in the banknote storage cassette 36. Therefore, for each post-process in the money teller machine, the banknote can be sent to a predetermined place, and occurrence of trouble such as jamming of the banknote in the money teller machine can be suppressed.

Further, in the banknote handling machine 10 according to the present embodiment, the storage/feeding unit 30 provided in the upper assembly 14 can be used for various purposes. For example, in the depositing process of the banknotes, when the banknote fed out from the inlet unit 20 into the housing 12 is recognized by the recognition unit 26, the banknote of the kind that is not allocated to the banknote storage bag 34 and the banknote storage cassette 36 in the above-mentioned predetermined classification condition may be sent to the storage/feeding unit 30 by the transporting unit 24.

Further, as described above, in the depositing process of the banknotes, when the banknote storage bag 34 or the banknote storage cassette 36 to which the banknote recognized by the recognition unit 26 is to be sent is in the full state or near-full state and the banknote can not be stored in these storage bag 34 or the banknote storage cassette 36, the banknote recognized by the recognition unit 26 may be sent to the storage/feeding unit 30 and stored in this storage/feeding unit 30. In this case, when the banknote storage bag 34 or the banknote storage cassette 36 of the full state or near-full state is taken out from the lower assembly 16 and the empty banknote storage bag 34 or empty banknote storage cassette 36 is mounted on the lower assembly 16, depending on the storage order of the banknote in the storage/feeding unit 30 and information on the banknote stored in the storage/feeding unit 30 stored in the memory unit 54, the banknote is fed out one by one from the storage/feeding unit 30 to the transporting unit 24 and sent to the banknote storage bag 34 or the banknote storage cassette 36 by the transporting unit 24. In this manner, in the present embodiment, the storage/feeding unit 30 can be used as a storage unit for temporarily storing the overflow banknote when stored in the banknote storage bag 34 or the banknote storage cassette 36.

Further, as another use of the storage/feeding unit 30, in the depositing process of the banknotes, when the paper sheet such as the check, the gift voucher and the like other than the banknote are put into the inlet unit 20 and the paper sheet is recognized by the recognition unit 26, this paper sheet may be sent to the storage/feeding unit 30 by the transporting unit 24. In this case, the storage/feeding unit 30 is used as a non-money storage unit for storing the paper sheet other than the banknote.

When the operator gives a command to collect the banknotes to the controlling unit 50 by the operation/display unit 52, all the banknotes stored in the storage/feeding unit 30 are fed out one by one from the storage/feeding unit 30 to the transporting unit 24, and the fed banknote is sent to the ejecting unit 22 by the transporting unit 24 and stacked in the ejecting unit 22. Thus, the operator can take out the dispensed banknotes from the ejecting unit 22 to outside of the housing 12 and collect them.

Further, as a further use of the storage/feeding unit 30, it is also possible to store the banknotes to be dispensed (for example, the banknote of a specific one denomination designated in advance) in the storage/feeding unit 30 in advance. In this case, the banknote handling machine 10 according to the present embodiment can perform the dispensing process of the banknotes. More specifically, when the operator gives a command to start the dispensing process together with the dispense amount of money to the controlling unit 50 by the operation/display unit 52, the banknotes corresponding to the designated dispense amount are fed out one by one from the storage/feeding unit 30 to the transporting unit 24 and the fed banknote is sent to the ejecting unit 22 by the transporting unit 24 and stacked in the ejecting unit 22. Thus, the operator can take out the dispensed banknotes from the ejecting unit 22 to outside of the housing 12.

Further, as a further use of the storage/feeding unit 30, the banknotes for currency exchange (for example, the banknotes of a specific denomination designated in advance) may be stored in the storage/feeding unit 30 in advance. In this case, the banknote handling machine 10 according to the present embodiment can perform the exchange process of the banknotes. Specifically, when the operator puts the banknotes of a certain denomination into the housing 12 of the banknote handling machine 10 via the inlet unit 20 and the put banknotes are stored in the banknote storage bag 34 or the banknote storage cassette 36, the banknotes having the same amount as the total amount of the banknotes put into the housing 12 of the banknote handling machine 10 and having different denomination are fed out one by one from the storage/feeding unit 30 to the transporting unit 24, and the fed banknote is sent to the ejecting unit 22 by the transporting unit 24 and stacked in this ejecting unit 22. Thus, the operator can take out the exchanged banknotes from the ejecting unit 22 to outside of the housing 12.

In the case where the banknote handling machine 10 according to the present embodiment can perform the dispensing process and exchanging process of the banknotes by previously storing the banknotes to be dispensed or the banknotes to be ejected as the exchanged banknotes in the storage/feeding unit 30, when the banknote handling machine 10 performs the depositing process of the banknotes, the banknote of a specific denomination designated in advance, out of the banknote fed out from the inlet unit 20 into the housing 12 and recognized by the recognition unit 26, may be sent to the storage/feeding unit 30 by the transporting unit 24 for use as the banknote to be dispensed or the banknote to be ejected as the exchanged banknotes. In this case, even if the operator does not replenish the banknotes to be dispensed or the banknotes to be ejected as the exchanged banknotes with the storage/feeding unit 30, it is possible to store the banknotes to be dispensed or the banknotes to be ejected as the exchanged banknotes in the storage/feeding unit 30 in advance.

As another use of the storage/feeding unit 30, the storage/feeding unit 30 may be used as a deposit escrow unit. In such a banknote handling machine 10, when the banknote put into the inlet unit 20 is fed out into the housing 12 and recognized by the recognition unit 26, normal banknote is sent to the storage/feeding unit 30 by the transporting unit 24 and escrowed in the storage/feeding unit 30. On the other hand, the banknote recognized by the recognition unit 26 as not being normal banknote and the banknote that is not recognizable by the recognition unit 26 are sent to the ejecting unit 22 by the transporting unit 24 as the reject banknote, and then the reject banknote stacked in the ejecting unit 22 is taken out to outside of the housing 12 by the operator. When all the banknotes put in the inlet unit 20 are fed out into the housing 12 and sent to the storage/feeding unit 30 or the ejecting unit 22, the operator can send a command to confirm the depositing process by the controlling unit 50. Then, when the command to confirm the depositing process is given to the controlling unit 50, the banknotes are fed out from the storage/feeding unit 30 to the transporting unit 24, and the fed banknotes are sent to the banknote storage bag 34 or the banknote storage cassette 36 by the transporting unit 24 based on the predetermined classification condition. On the other hand, when a return command is given to the controlling unit 50 instead of giving the command to confirm the depositing process to the controlling unit 50, the banknotes are fed out from the storage/feeding unit 30 to the transporting unit 24, and the fed banknotes are sent to the ejecting unit 22 by the transporting unit 24 and stacked in the ejecting unit 22. Then, the returned banknotes stacked in the ejecting unit 22 are taken out to outside of the housing 12 by the operator.

In the banknote handling machine 10 according to the present embodiment, it is possible to perform a counting process of the banknotes as described below, and when such a counting process of the banknotes is performed, the storage/feeding unit 30 may be used. Specifically, when the counting process of the banknotes is performed in the banknote handling machine 10 according to the present embodiment, the banknotes put into the inlet unit 20 are fed out to inside of the housing 12 by the banknote feeding mechanism 20*a* and recognized by the recognition unit 26. Then, the banknote judged to be normal banknote is sent to the ejecting unit 22. On the other hand, as for the banknote judged not to be normal banknote (i.e., reject banknote) based on the recognition result by the recognition unit 26, the setting can be made by the operator, for example, by the operation/display unit 52. The above setting includes a mode in which the reject banknote is sent to the ejecting unit 22 and stacked in a mixed state with the normal banknote in the ejecting unit 22, and a mode in which the reject banknote is escrowed in the storage/feeding unit 30 and the escrowed banknote is fed out from the storage/feeding unit 30 and sent to the ejecting unit 22 after the normal banknote is taken out from the ejecting unit 22.

Further, when the counting process of the banknotes is performed in the banknote handling machine 10 according to the present embodiment, it may be possible to perform a special counting mode of counting only the banknotes of a specific denomination. In such a special counting mode, when the banknotes put into the inlet unit 20 are fed out into the housing 12 by the banknote feeding mechanism 20*a* and recognized by the recognition unit 26, the banknote of the specific denomination designated in advance among the banknote judged as being normal banknote is sent to the ejecting unit 22. Then, in the controlling unit 50, based on the recognition result by the recognition unit 26, only the banknotes of the specific denomination designated in advance among the banknotes judged to be normal banknotes are counted. On the other hand, based on the recognition result by the recognition unit 26, the banknote judged not to be normal banknote (i.e., reject banknote) and the banknote judged as normal banknote but not the specific denomination are escrowed in the storage/feeding unit 30. Then, after the normal banknotes of the specific denomination are taken out from the ejecting unit 22, the remaining banknotes are fed out from the storage/feeding unit 30 and sent to the ejecting unit 22.

In the present embodiment, if the banknote is stored in the storage/feeding unit 30 of the tape-type, the controlling unit 50 may perform control to store information related to the banknotes (for example, information such as the denomination and serial number of the banknote) stored in the storage/feeding unit 30 in association with the order in which each banknote is stored in the storage/feeding unit 30 in the memory unit 54. In this case, when the banknotes are fed out from the storage/feeding unit 30 to the transporting unit 24 and sent to the ejecting unit 22, the banknote storage bag 34, the banknote storage cassette 36 and the like, information on the banknote fed out to the transporting unit 24 can be specified. Therefore, the controlling unit 50 performs control to store the banknote whose corresponding banknote storage bag 34 or banknote storage cassette 36 is in the full state or near-full state in the storage/feeding unit 30, and fed out the banknotes one by one from the storage/feeding unit 30 to the transporting unit 24 when the banknote storage bag 34 or banknote storage cassette 36 becomes not in the full state or near-full state. Then, depending on the above information stored in the memory unit 54 and the predetermined classification condition, the banknote fed out from the storage/feeding unit 30 is stored in the corresponding banknote storage bag 34 or banknote storage cassette 36.

As described above, in the banknote handling machine 10 according to the present embodiment, the storage/feeding unit 30 can be used for various purposes. Therefore, in the banknote handling machine 10 according to the present embodiment, it is made possible to execute the dispensing process and exchanging process of the banknotes, and the overflow banknote and the paper sheet such as the check, the gift voucher and the like other than the banknote can be stored in the storage/feeding unit 30 in the depositing process of the banknotes.

The banknote handling machine according to the present embodiment is not limited to the aspect in which two branched transporting units 25 are branched from the transporting unit 24 respectively. In the present embodiment, as shown in FIGS. 5 to 8, a banknote handling machine 10*a* in which three branched transporting units 25 are branched from the transporting unit 24 may be used. Details of the configuration of such a banknote handling machine 10*a* will be described below. In describing the configuration of the banknote handling machine 10*a* shown in FIGS. 5 to 8, the same components as those of the banknote handling machine 10 shown in FIGS. 1 to 3 are denoted by the same reference numerals, and description thereof is omitted.

Figure 5:
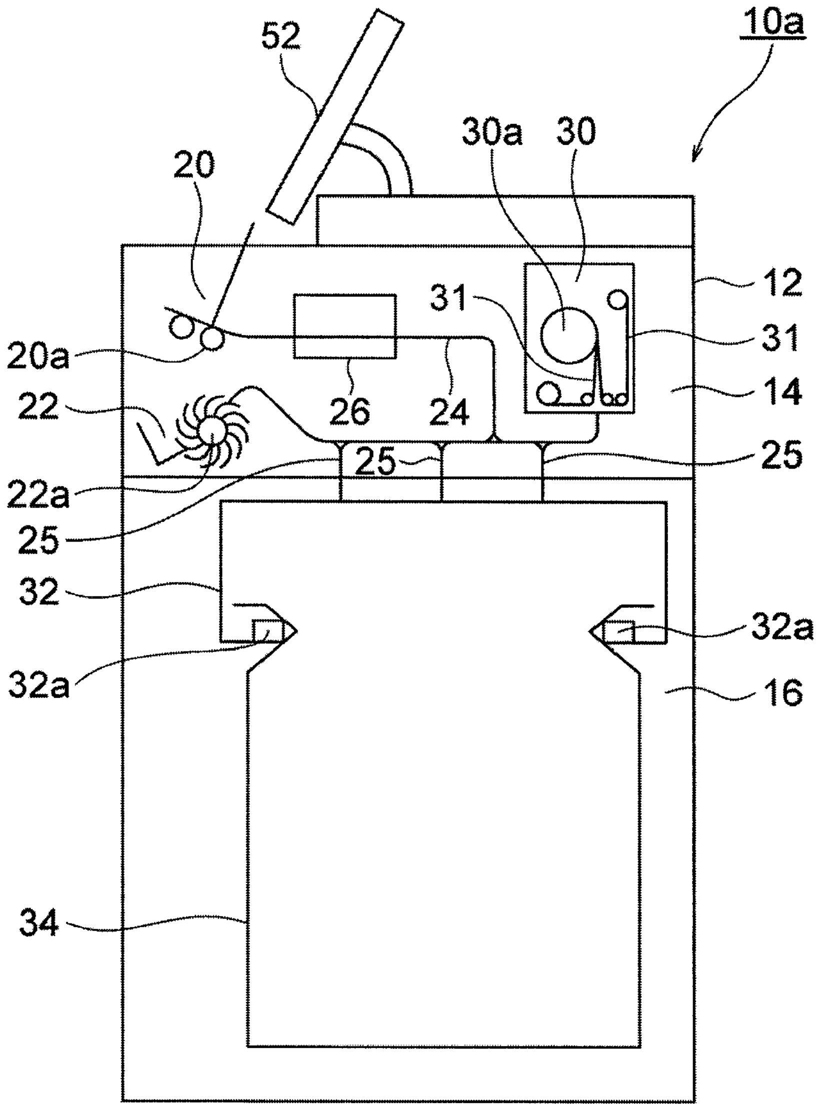
FIG. 5 is a schematic configuration view showing another example of a configuration of a banknote handling machine according to the embodiment of the present invention.
Figure 6:
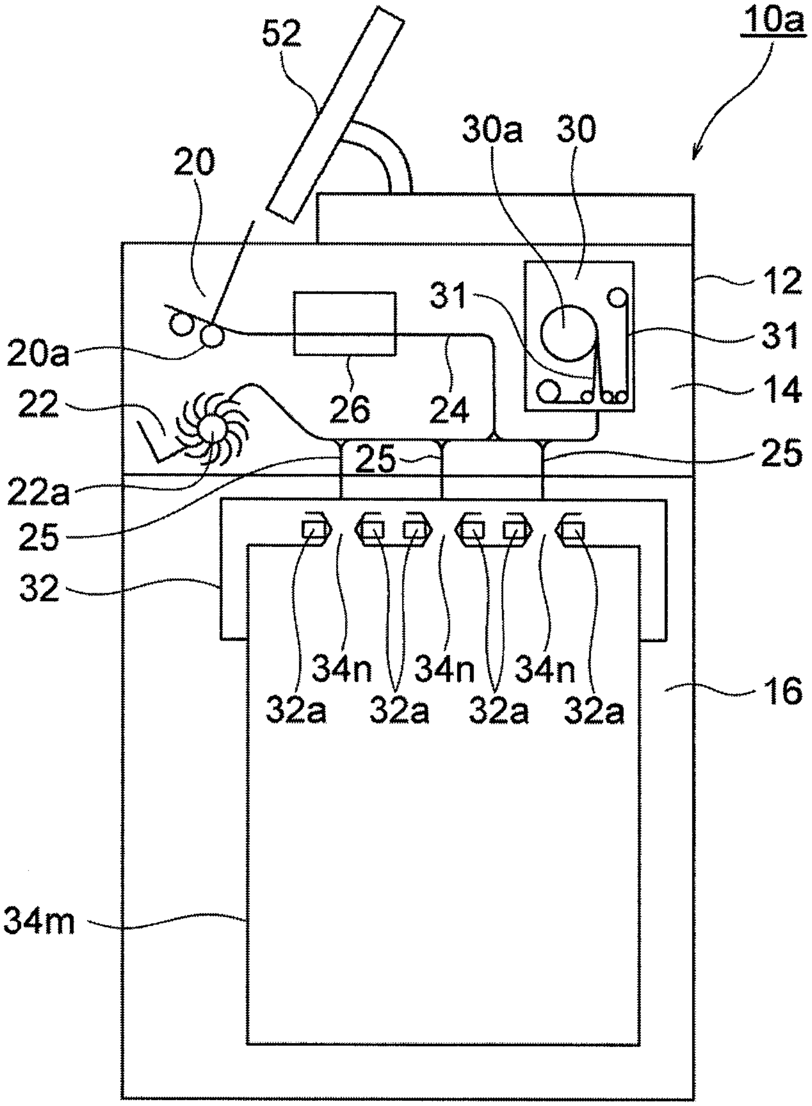
FIG. 6 is a schematic configuration view showing another configuration example of a banknote storage bag mounted on the lower assembly in the banknote handling machine shown in FIG. 5.
Figure 7:
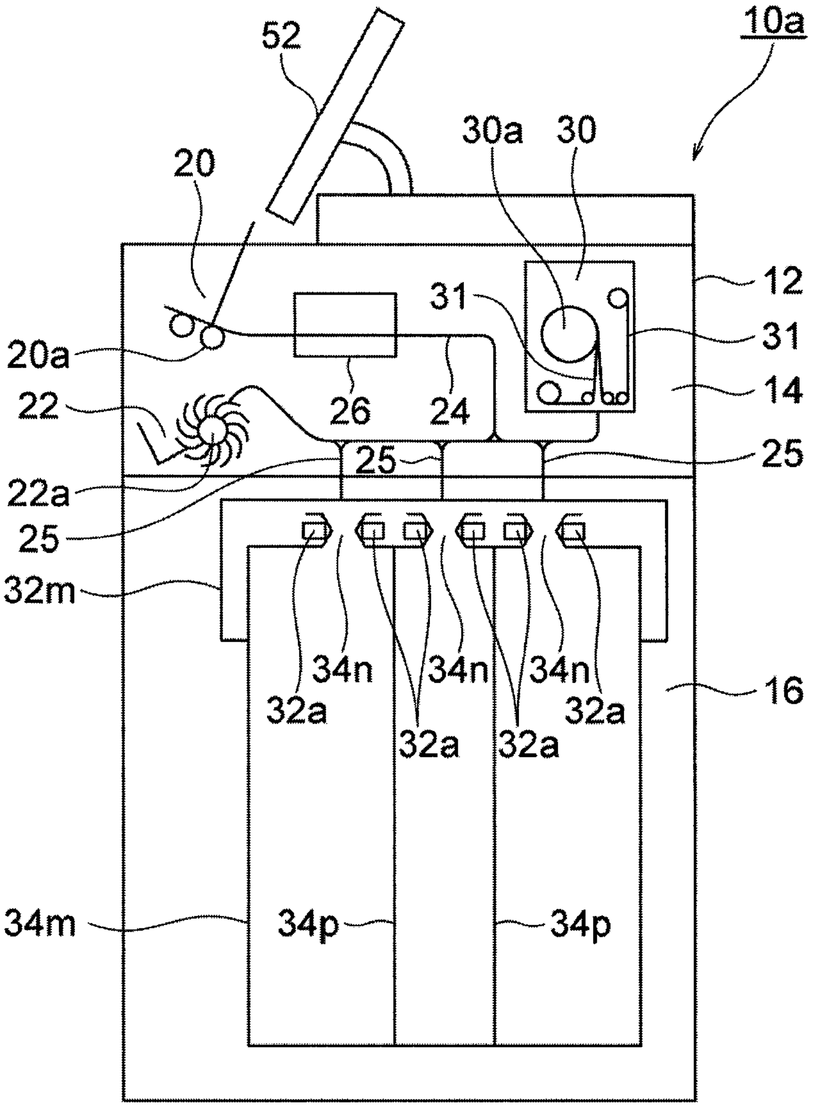
FIG. 7 is a schematic configuration view showing yet another configuration example of a banknote storage bag mounted on the lower assembly in the banknote handling machine shown in FIG. 5.

In the banknote handling machine 10*a* shown in FIGS. 5 to 7, a plurality of banknote entrances from the upper assembly 14 to the lower assembly 16 are provided for one storage unit (specifically, the banknote storage bag 34). Specifically, in the aspect as shown in FIG. 5, the banknote storage bag 34 provided with one large opening is adapted to be mounted on the mounting unit 32 such that the large opening of the banknote storage bag 34 straddles the plurality of (three in the example shown in FIG. 5) entrances from the upper assembly 14 to the lower assembly 16. In such an aspect, the banknotes branched from the transporting unit 24 to the respective branched transporting units 25 in the upper assembly 14 are all stored in the same banknote storage bag 34 regardless of the banknote sent to any of the branched transporting units 25. According to such a banknote handling machine 10*a*, after the banknotes are stored in the banknote storage bag 34, the operator draws the lower assembly 16 forward from the front surface of the housing 12, whereby the banknote storage bag 34 can be taken out from the mounting unit 32 and collected. In the banknote handling machine 10*a* shown in FIG. 5, by sequentially branching the banknotes from the transporting unit 24 to each branched transporting unit 25, the banknotes can be stored evenly in the banknote storage bag 34. When the banknote storage bag 34 in which the banknotes are stored is taken out from the mounting unit 32 and collected, the opening of the banknote storage bag 34 may be sealed by heat sealing or the cloth bag may be mounted on the mounting unit 32 as the banknote storage bag 34.

In an aspect as shown in FIG. 6, a plurality of (three in the example shown in FIG. 6) openings 34*n* are provided in a banknote storage bag 34*m* to be mounted on the mounting unit 32 so as to correspond to each of the plurality of entrances from the upper assembly 14 to the lower assembly 16. In such an embodiment, the banknotes branched from the transporting unit 24 to the respective branched transporting units 25 in the upper assembly 14 are stored in the banknote storage bag 34*m* via the opening 34*n* corresponding to the branched transporting unit 25. As in the aspect shown in FIG. 5, in the aspect shown in FIG. 6, the banknotes branched from the transporting unit 24 to the respective branched transporting units 25 in the upper assembly 14 are all stored in the same banknote storage bag 34*m* regardless of the banknote sent to any of the branched transporting units 25. In the aspect shown in FIG. 6, a plurality of holding members 32*a* are provided corresponding to each opening 34*n* of the banknote storage bag 34*m*, and each opening 34*n* is sealed by heat by each of the plurality of holding members 32*a*. Even in such a banknote handling machine 10*a*, after the banknotes are stored in the banknote storage bag 34*m*, the operator draws the lower assembly 16 forward from the front surface of the housing 12 to take out the banknote storage bag 34*m* in which the banknotes are stored from the mounting unit 32 and collect it.

In an aspect as shown in FIG. 7, in the banknote storage bag 34*m* provided with a plurality of the openings 34*n* as shown in FIG. 6, the inside thereof is partitioned into a plurality of areas by a partition member 34*p*. More specifically, the inside of the banknote storage bag 34*m* is partitioned by the partition member 34*p* so that the plurality of areas corresponding to each of the plurality of openings 34*n* provided in the banknote storage bag 34*m* are formed. As a result, the banknotes stored in the banknote storage bag 34*m* via the opening 34*n* are stored in the area corresponding to the opening 34*n* among the plurality of areas partitioned by the partition member 34*p*. In the aspect shown in FIG. 7, the banknotes branched from the transporting unit 24 to the respective branched transporting units 25 in the upper assembly 14 are stored in the respective areas of the banknote storage bag 34*m* via the opening 34*n* corresponding to the branched transporting unit 25 in a classified state. Even in such an aspect shown in FIG. 7, the plurality of the holding members 32*a* are provided corresponding to each opening 34*n* of the banknote storage bag 34*m*, and each opening 34*n* is sealed by heat by each of the plurality of holding members 32*a*. Further, even in such a banknote handling machine 10*a*, after the banknotes are stored in the banknote storage bag 34*m*, the operator draws the lower assembly 16 forward from the front surface of the housing 12 to take out the banknote storage bag 34*m* in which the banknotes are stored from the mounting unit 32 and collect it.

According to the aspects as shown in FIGS. 5 to 7, with respect to the plurality of (more specifically, three) entrances from the upper assembly 14 to the lower assembly 16, one banknote storage bag 34, 34*m* is provided. Therefore, it is possible to increase the storage amount of the banknotes in the banknote storage bag 34, 34*m*. Further, the plurality of entrances for sending the banknotes to the banknote storage bag 34, 34*m* are provided for one banknote storage bag 34, 34*m*. Therefore, the banknotes stored in the banknote storage bag 34, 34*m* are easily scattered within the banknote storage bag 34, 34*m*, and then the banknote storage bag 34, 34*m* can store the banknotes evenly inside the banknote storage bag 34, 34*m*. In addition, since the storage amount of banknote storage bag 34, 34*m* can be increased, the number of banknote storage bag 34, 34*m* used can be reduced. If the amount of insurance at the time of collecting the banknote storage bag 34, 34*m* is set based on the number of use of the banknote storage bag 34, 34*m*, the amount of insurance can be reduced by decreasing the number of banknote storage bag 34, 34*m* used. Also in the banknote handling machine 10*a* as shown in FIGS. 5 to 7, in correspondence with the plurality of (specifically, three) entrances from the upper assembly 14 to the lower assembly 16, the plurality of banknote storage bags 34 having relatively small sizes can be mounted. As described above, in the banknote handling machine 10*a* as shown in FIGS. 5 to 7, it is possible to respond to both of a desire to prioritize large capacity of the banknote storage bag 34, 34*m* and a desire to store the banknotes in the plurality of banknote storage bags 34 by denomination. Therefore, it is possible to conduct an efficiently operation according to the actual state of the cash process and the banknote collection work at the store where the banknote handling machine 10*a* is installed.

Figure 8:
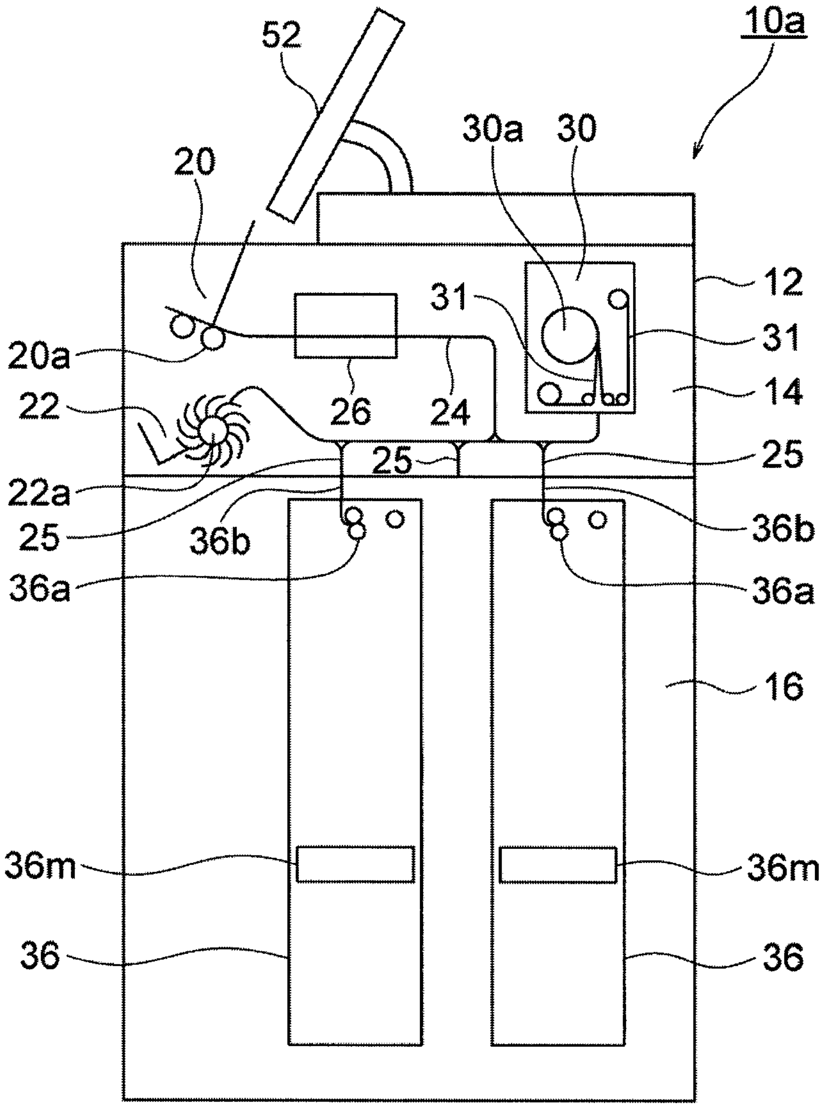
FIG. 8 is a schematic configuration view showing a state when two banknote storage cassettes are mounted on the lower assembly in the banknote handling machine shown in FIG. 5.

Further, in the banknote handling machine 10*a* in which three branched transporting units 25 are branched from the transporting unit 24, as shown in FIG. 8, two banknote storage cassettes 36 can be mounted on the lower assembly 16. In such an aspect shown in FIG. 8, fewer number of the banknote storage cassettes 36 are mounted on the lower assembly 16 than the number of entrances from the upper assembly 14 to the lower assembly 16 (more specifically three). In this case, it is possible to increase the storage amount of the banknotes in the banknote storage cassette 36, as compared with the case where the same number of the banknote storage cassettes 36 as the number of entrances from the upper assembly 14 to the lower assembly 16 are mounted on the lower assembly 16. Further, if the storage amount of the banknotes in the banknote storage cassette 36 is increased, the number of banknote storage cassettes 36 to be used can be reduced. If the amount of insurance at the time of collection of the banknote storage cassettes 36 is set based on the number of used banknote storage cassettes 36, the amount of insurance can be reduced by decreasing the number of used banknote storage cassettes 36.

Further, in the banknote handling machine 10*a* as shown in FIG. 8, each time a predetermined number of the banknotes are stored in each banknote storage cassette 36, the banknotes stored in the banknote storage cassette 36 can be compressed in the stacked direction (that is, in the vertical direction in FIG. 8). Specifically, when the plurality of banknotes are stacked in the stacked manner on the stage 36*m* in the banknote storage cassette 36, as the stage 36*m* rises, the plurality of banknotes on the stage 36*m* are compressed by being sandwiched between a ceiling portion of an inner wall of the banknote storage cassette 36 and the stage 36*m* from above and below. As a result, even when the plurality of banknotes stacked on the stage 36*m* in the banknote storage cassette 36 are inflated, it is possible to eliminate the bulging of the banknotes by performing such compressing process. Thus, many banknotes can be stored in the banknote storage cassette 36.

In the banknote handling machine 10*a* as shown in FIG. 8, two banknote storage cassettes 36 are mounted on the lower assembly 16. In the case where the same denomination is allocated to the two banknote storage cassettes 36, in the depositing process of the banknotes, while the number of banknotes stored in one banknote storage cassette 36 (for example, the banknote storage cassette 36 on the left side) has reached a predetermined number and the stored banknotes are being compressed in this banknote storage cassette 36, the banknotes fed out to inside of the housing 12 from the inlet unit 20 and recognized by the recognition unit 26 are sent to the other banknote storage cassette 36 (for example, the banknote storage cassette 36 on the right side) by the transporting unit 24. Then, the banknote storage cassette 36 to which the banknotes fed out to inside of the housing 12 from the inlet unit 20 and recognized by the recognition unit 26 are sent is switched to one banknote storage cassettes 36 (for example, the banknote storage cassette 36 on the left side) at the timing when the above compressing process ends in one banknote storage cassette 36 (for example, banknote storage cache 36 on the left side) or the timing of starting the above compressing process in the other banknote storage cassette 36 (for example, the banknote storage cassette 36 on the right side) after completion of the above compressing process in one banknote storage cassette 36. According to such a banknote handling machine 10*a*, it is possible to sequentially perform the compressing process of the banknotes in each banknote storage cassette 36 without stopping the depositing process of the banknotes on the way, so the time taken for depositing the banknotes can be shorten. Specifically, in the prior art, when performing the above-described compressing process in the banknote storage cassette, the feeding operation of the banknotes from the insertion portion into the casing is temporarily stopped so that the banknotes are not sent to the banknote storage cassette. However, in such a method, since the depositing process of the banknotes temporarily stops, the time until the depositing process of the banknotes is completed also becomes long. In addition, since the operator can not know that the compressing process of the banknotes is performed in the banknote storage cassette of the banknote handling machine, if the depositing process temporarily stops while the banknotes are being compressed, the operator may feel stressed. On the other hand, in the banknote handling machine 10*a* according to the present embodiment, during the compressing process of the banknotes in one banknote storage cassette 36, the banknotes fed out from the inlet unit 20 into the housing 12 and recognized by the recognition unit 26 are sent to the other banknote storage cassette 36. Therefore, it is not necessary to stop the depositing process of the banknotes once, and hence it is possible to shorten the time until the depositing process of the banknotes is completed. Further, in the present embodiment, since the depositing process of the banknotes never stops even while the compressing process of the banknotes is performed, the operator does not feel the stress.

In the banknote handling machine 10, 10*a* according to the present embodiment, when sorting each banknote, sent from the transporting unit 24 of the upper assembly 14 to the lower assembly 16, to each storage unit (specifically, the banknote storage bag 34 or the banknote storage cassette 36), the controlling unit 50 performs control to store all the banknotes sent from the transporting unit 24 of the upper assembly 14 to the lower assembly 16 in a specified storage unit in a mixed state, if a predetermined switching condition is satisfied. Specifically, in the depositing process of the banknotes conducted by the banknote handling machines 10, 10*a* according to the present embodiment, in the case where the banknotes are branched from the transporting unit 24 of the upper assembly 14 to the branched transporting unit 25 for each denomination and sent to the banknote storage bag 34 or the banknote storage cassette 36, when the number of the deposited banknotes of a specific denomination designated in advance exceeds a preset number designated in advance, the banknotes are stored in the specific banknote storage bags 34 or the specific banknote storage cassette 36 designated in advance in the mixed state other than the banknote storage bag 34 or the banknote storage cassette 36 in which the banknotes of this specific denomination are to be stored. Alternatively, when a certain banknote storage bag 34 or banknote storage cassette 36 becomes in the full state or near-full state, the banknotes may be stored in the specific banknote storage bag 34 or the specific banknote storage cassette 36 designated in advance in the mixed state other than the above certain banknote storage bag 34 or the above certain banknote storage cassette 36. According to the prior art, in the depositing process of the banknotes conducted by the banknote handling machine, if the banknotes are sorted to each storage unit for each denomination, when the number of the deposited banknotes of a specific denomination is large, despite the fact that the storage unit in which the banknotes of denominations other than this specific denomination should be stored is not readily in the full state or near-full state, the storage unit in which the banknotes of the above specific denomination should be stored becomes immediately in the full state or near-full state. Therefore, it is necessary to temporarily stop the depositing process and draw the lower assembly from the front surface of the housing to the front side to collect the banknotes from the storage unit, resulting in a problem of inefficiency. On the other hand, in the banknote handling machine 10, 10*a* according to the present embodiment, in the depositing process of the banknotes, in the case where the number of deposited banknotes of a specific denomination is large, when the above-described predetermined switching condition is satisfied, the banknotes of this denomination can also be stored in the other storage unit. Therefore, it is possible to lengthen the time until the depositing process is temporarily stopped, thereby improving the efficiency of handling the banknotes.

When the controlling unit 50 performs control to store all the banknotes sent from the transporting unit 24 of the upper assembly 14 to the lower assembly 16 in a specific storage unit designated in advance (specifically, the banknote storage bag 34 or the banknote storage cassette 36) in the mixed state, the controlling unit 50 performs control so as to enable storage of the banknotes in the storage unit other than the specified storage unit designated in advance at a predetermined time. Specifically, for example, one hour before the closing balance process is performed in the banknote handling machine 10, 10*a* according to the present embodiment, the controlling unit 50 may perform control so as to enable storage of the banknotes in the storage unit other than the specific storage unit designated in advance. This makes it possible to lengthen the time until the specific storage unit to which all banknotes are sent in the mixed state becomes in the full state or near-full state, and then it is possible to reduce the frequency with which the security guard staff of the security transportation company and the like collects the storage unit such as the banknote storage bag 34 or the banknote storage cassette 36 from the lower assembly 16 of the banknote handling machine 10, 10*a*.

In the banknote processing machine according to the present invention, three or more banknote storage bags or three or more banknote storage cassettes may be mounted on the lower assembly. In this case, for example, with respect to two banknote storage bags or two banknote storage cassettes, the banknotes are sorted according to the above predetermined classification condition and stored, but in the remaining banknote storage bag or banknote storage cassette, the banknotes conforming to the respective conditions in the predetermined classification condition are stored in the mixed state. Specifically, when the banknote storage bag and the banknote storage cassette in which the banknotes are sorted based on the predetermined classification condition and stored is brought into the full state or near-full state, and the banknote can not be stored in this banknote storage bag or banknote storage cassette, such a banknote is stored in the remaining banknote storage bag or banknote storage cassette in the mixed state as the overflow banknote.

It should be noted that the paper sheet handling machine according to the present invention is not limited to the banknote handling machines 10, 10*a* that perform various processes such as the depositing process, dispensing process, exchanging process and the like of the banknotes as described above. As a paper sheet handling machine according to the present invention, one capable of performing various processes such as the depositing process, dispensing process and the like of the paper sheet, such as the check, gift voucher and the like, other than the banknote can be applied.

The invention claimed is:

1. A paper sheet handling machine comprising:

an upper assembly including an inlet unit for putting a paper sheet into inside of a housing from outside, an ejecting unit for ejecting the paper sheet from inside of the housing to outside, a transporting unit connected to the inlet unit and the ejecting unit, for transporting the paper sheet within the housing, and a recognition unit provided to the transporting unit for recognizing the paper sheet being transported by the transporting unit;

a lower assembly including a plurality of storage units for storing the paper sheet sent from the transporting unit of the upper assembly; and a controlling unit configured to perform control to sort the paper sheet that is to be sent from the transporting unit of the upper assembly to the lower assembly, to each of the storage units based on a predetermined classification condition designated in advance, wherein the predetermined classification condition is a condition for classifying a banknote out of the paper sheet into a banknote to be used for replenishment and a banknote to be collected, and the banknote to be used for replenishment is stored in a paper sheet storage cassette among the plurality of storage units, and the banknote to be collected is stored in a paper sheet storage bag among the plurality of storage units.

2. The paper sheet handling machine as claimed in claim 1, wherein at least one of the plurality of storage units is a paper sheet storage bag.

3. The paper sheet handling machine as claimed in claim 1, wherein at least one of the plurality of storage units is a paper sheet storage cassette and at least one other storage unit is a paper sheet storage bag.

4. The paper sheet handling machine as claimed in claim 1, wherein the predetermined classification condition is such a condition that a banknote out of the paper sheet is classified into a fit note of the banknote and an unfit note or counterfeit note of the banknote.

5. The paper sheet handling machine as claimed in claim 1, wherein the predetermined classification condition is such a condition that the paper sheet is classified into a banknote and the paper sheet other than the banknote.

6. The paper sheet handling machine as claimed in claim 1, wherein the predetermined classification condition is a condition for classifying a banknote out of the paper sheet into a banknote until reaching a predetermined total amount in one transaction and a banknote after reaching the predetermined total amount in one transaction.

7. A paper sheet handling machine comprising:

an upper assembly including an inlet unit for putting a paper sheet into inside of a housing from outside, an ejecting unit for ejecting the paper sheet from inside of the housing to outside, a transporting unit connected to the inlet unit and the ejecting unit, for transporting the paper sheet within the housing, and a recognition unit provided to the transporting unit for recognizing the paper sheet being transported by the transporting unit;

a lower assembly including a plurality of storage units for storing the paper sheet sent from the transporting unit of the upper assembly; and a controlling unit configured to perform control to sort the paper sheet that is to be sent from the transporting unit of the upper assembly to the lower assembly, to each of the storage units based on a predetermined classification condition designated in advance, wherein the predetermined classification condition is such a condition that a banknote out of the paper sheet is classified into a banknote to be used for reconciliation of a store in which the paper sheet handling machine is installed and a banknote to be collected.

8. A paper sheet handling machine comprising:

an upper assembly including an inlet unit for putting a paper sheet into inside of a housing from outside, an ejecting unit for ejecting the paper sheet from inside of the housing to outside, a transporting unit connected to the inlet unit and the ejecting unit, for transporting the paper sheet within the housing, and a recognition unit provided to the transporting unit for recognizing the paper sheet being transported by the transporting unit;

a lower assembly including a plurality of storage units for storing the paper sheet sent from the transporting unit of the upper assembly; and a controlling unit configured to perform control to sort the paper sheet that is to be sent from the transporting unit of the upper assembly to the lower assembly, to each of the storage units based on a predetermined classification condition designated in advance, wherein the predetermined classification condition is such a condition that a banknote out of the paper sheet is classified into a banknote to be used for reconciliation of a current day and a banknote to be used for reconciliation of a next day.

9. A paper sheet handling machine comprising:

an upper assembly including an inlet unit for putting a paper sheet into inside of a housing from outside, an ejecting unit for ejecting the paper sheet from inside of the housing to outside, a transporting unit connected to the inlet unit and the ejecting unit, for transporting the paper sheet within the housing, and a recognition unit provided to the transporting unit for recognizing the paper sheet being transported by the transporting unit;

a lower assembly including a plurality of storage units for storing the paper sheet sent from the transporting unit of the upper assembly; and a controlling unit configured to perform control to sort the paper sheet that is to be sent from the transporting unit of the upper assembly to the lower assembly, to each of the storage units based on a predetermined classification condition designated in advance, wherein the predetermined classification condition is such a condition that a banknote out of the paper sheet is classified into a banknote for which depositing process is reconciled and a banknote that is deposited after a closing balance process.

10. A paper sheet handling machine comprising:

an upper assembly including an inlet unit for putting a paper sheet into inside of a housing from outside, an ejecting unit for ejecting the paper sheet from inside of the housing to outside, a transporting unit connected to the inlet unit and the ejecting unit, for transporting the paper sheet within the housing, and a recognition unit provided to the transporting unit for recognizing the paper sheet being transported by the transporting unit;

a lower assembly including a plurality of storage units for storing the paper sheet sent from the transporting unit of the upper assembly; and a controlling unit configured to perform control to sort the paper sheet that is to be sent from the transporting unit of the upper assembly to the lower assembly, to each of the storage units based on a predetermined classification condition designated in advance, wherein the predetermined classification condition is a condition for classifying a banknote out of the paper sheet into a high-value banknote that is higher than a predetermined amount and a low-value banknote that is not more than the predetermined amount.

11. The paper sheet handling machine as claimed in claim 10, wherein the high-value banknote that is higher than the predetermined amount is stored in a paper sheet storage bag among the plurality of storage units, and the low-value banknote that is not more than the predetermined amount is stored in a paper sheet storage cassette among the plurality of storage units.

12. A paper sheet handling machine comprising:

an upper assembly including an inlet unit for putting a paper sheet into inside of a housing from outside, an ejecting unit for ejecting the paper sheet from inside of the housing to outside, a transporting unit connected to the inlet unit and the ejecting unit, for transporting the paper sheet within the housing, and a recognition unit provided to the transporting unit for recognizing the paper sheet being transported by the transporting unit;

a lower assembly including a plurality of storage units for storing the paper sheet sent from the transporting unit of the upper assembly; and a controlling unit configured to perform control to sort the paper sheet that is to be sent from the transporting unit of the upper assembly to the lower assembly, to each of the storage units based on a predetermined classification condition designated in advance, wherein the predetermined classification condition is a condition for classifying a banknote out of the paper sheet into a banknote issued by a home country or an organization related to the home country and a banknote issued by a country or organization other than the home country.

13. A paper sheet handling machine comprising:

an upper assembly including an inlet unit for putting a paper sheet into inside of a housing from outside, an ejecting unit for ejecting the paper sheet from inside of the housing to outside, a transporting unit connected to the inlet unit and the ejecting unit, for transporting the paper sheet within the housing, and a recognition unit provided to the transporting unit for recognizing the paper sheet being transported by the transporting unit;

a lower assembly including a plurality of storage units for storing the paper sheet sent from the transporting unit of the upper assembly; and a controlling unit configured to perform control to sort the paper sheet that is to be sent from the transporting unit of the upper assembly to the lower assembly, to each of the storage units based on a predetermined classification condition designated in advance, wherein the controlling unit performs control so that all the paper sheets to be sent from the transporting unit of the upper assembly to the lower assembly are stored in a specific storage unit designated in advance in a mixed state, when a predetermined switching condition is satisfied at the time of sorting the paper sheet, to be sent from the transporting unit of the upper assembly to the lower assembly, to each of the storage units.

14. The paper sheet handling machine as claimed in claim 13, wherein the predetermined switching condition is a condition in which the number of the deposited banknote of a specific denomination designated in advance exceeds a predetermined number designated in advance, and the controlling unit performs control so that the paper sheet, to be sent from the transporting unit of the upper assembly to the lower assembly, is stored in the specific storage unit designated in advance other than the storage unit in which the banknote of the specific denomination designated in advance is to be stored, after the predetermined switching condition is satisfied.

15. The paper sheet handling machine as claimed in claim 13, wherein the predetermined switching condition is a condition in which a certain storage unit becomes in a full state or near-full state, and the controlling unit performs control so that the paper sheet, to be sent from the transporting unit of the upper assembly to the lower assembly, is stored in the specific storage unit designated in advance other than the storage unit which has become in the full state or near-full state, after the predetermined switching condition is satisfied.

16. The paper sheet handling machine as claimed in claim 13, wherein, when the controlling unit performs control so that all the paper sheets to be sent from the transporting unit of the upper assembly to the lower assembly are stored in the specific storage unit designated in advance, the control unit performs control so as to enable storage of the paper sheet in the storage unit other than the specific storage unit designated in advance at a predetermined timing.

17. A paper sheet handling machine comprising:

an upper assembly including an inlet unit for putting a paper sheet into inside of a housing from outside, an ejecting unit for ejecting the paper sheet from inside of the housing to outside, a transporting unit connected to the inlet unit and the ejecting unit, for transporting the paper sheet within the housing, and a recognition unit provided to the transporting unit for recognizing the paper sheet being transported by the transporting unit;

a lower assembly including a plurality of storage units for storing the paper sheet sent from the transporting unit of the upper assembly; and a controlling unit configured to perform control to sort the paper sheet that is to be sent from the transporting unit of the upper assembly to the lower assembly, to each of the storage units based on a predetermined classification condition designated in advance, wherein a storage/feeding unit for storing the paper sheet sent from the transporting unit and capable of feeding out the stored paper sheet to the transporting unit is provided in the upper assembly, and the control unit performs control so as to store a type of the paper sheet not allocated to any storage unit in the storage/feeding unit.

* * * * *